United States Patent
Lecheler et al.

(10) Patent No.: US 7,815,129 B2
(45) Date of Patent: Oct. 19, 2010

(54) CONVEYOR DEVICE

(75) Inventors: Stefan Lecheler, Bad Toelz (DE); Rolf Dittmann, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 660 days.

(21) Appl. No.: 11/494,695

(22) Filed: Jul. 28, 2006

(65) Prior Publication Data

US 2007/0001026 A1 Jan. 4, 2007

Related U.S. Application Data

(63) Continuation of application No. PCT/EP2005/050236, filed on Jan. 20, 2005.

(30) Foreign Application Priority Data

Jan. 28, 2004 (DE) ................. 10 2004 004 135

(51) Int. Cl.
*A01G 27/00* (2006.01)
*F02M 69/54* (2006.01)
*F02C 9/00* (2006.01)
*F02G 3/00* (2006.01)

(52) U.S. Cl. ............... 239/68; 239/67; 239/69; 123/463; 60/39.3

(58) Field of Classification Search .......... 239/67, 239/68, 69, 70; 60/39.3; 123/463
See application file for complete search history.

(56) References Cited

U.S. PATENT DOCUMENTS

| | | | |
|---|---|---|---|
| 4,200,073 A | 4/1980 | Stoltman | |
| 4,635,606 A | 1/1987 | Koike et al. | |
| 5,540,045 A * | 7/1996 | Corbett et al. | 60/39.3 |
| 6,209,310 B1 * | 4/2001 | Kuenzi et al. | 60/775 |
| 6,478,289 B1 * | 11/2002 | Trewin | 261/27 |
| 6,526,742 B1 * | 3/2003 | Ausserwoger et al. | 60/39.094 |
| 6,938,425 B2 * | 9/2005 | Simpson et al. | 60/775 |
| 6,938,834 B2 * | 9/2005 | Harris | 239/63 |
| 2003/0192300 A1 | 10/2003 | Mahoney et al. | |

FOREIGN PATENT DOCUMENTS

| | | |
|---|---|---|
| DE | 25 49 790 A1 | 5/1977 |
| EP | 0 900 780 A1 | 4/2000 |
| EP | 1 365 127 A2 | 11/2003 |
| FR | 1 563 749 | 12/1969 |

* cited by examiner

*Primary Examiner*—Len Tran
*Assistant Examiner*—Ryan Reis
(74) *Attorney, Agent, or Firm*—Buchanan Ingersoll & Rooney PC

(57) ABSTRACT

An apparatus and method are disclosed for continuously delivering and non-intermittently introducing a liquid into a main flow. An exemplary apparatus includes a supply line, a delivery line, a delivery device for delivering a mass flow of the liquid from the supply line to the delivery line, and at least one atomizing element communicating with the delivery line. A branch line which branches off from the delivery line can be arranged in the delivery direction downstream of the delivery device and upstream of the atomizing element, at least one changeover and/or regulating member for shutting off and/or throttling the branch line being arranged in combination with the branch line.

21 Claims, 9 Drawing Sheets

CONVEYOR DEVICE

RELATED APPLICATIONS

This application claims priority under 35 U.S.C. §119 to German Application 10 2004 004 135.0 filed in Switzerland on Jan. 28, 2004, and as a continuation application under 35 U.S.C. §120 to PCT/EP2005/050236 filed as an International Application on Jan. 20, 2005 designating the U.S., the entire contents of which are hereby incorporated by reference in their entireties.

BACKGROUND

1. Technical Field

The invention relates to an apparatus and method for continuously delivering and non-intermittently introducing a liquid into a main flow.

2. Background Information

Gas turbines are nowadays designed so as to be optimized in terms of both output and efficiency. Today's gas turbines therefore can have very small power reserves over and above the rated output. In order to briefly increase the output, or increase it for a longer period, above the rated output of the gas turbine, water or another suitable liquid can be injected or sprayed into the compressor flow of a gas turbine. The increase in output achieved as a result is due to the fact that the liquid evaporates after the spraying and heat is thereby extracted from the air flowing through the compressor. This evaporation process taking place continuously constitutes, as it were, continuous intercooling of the compressor flow, the result of which is that less compressor work has to be applied for compressing the compressor flow to a preset pressure ratio than would be required without the introduction of water. At the same time, the air mass flow rate through the compressor is increased. At a constant combustion-chamber outlet temperature, a higher net output is therefore available, which is used, for example, as shaft output. Such injection of water has been disclosed, for example, by the publications DE 25 49 790 and FR 1 563 749, which are hereby incorporated by reference in their entireties.

It is known to introduce water or another suitable liquid, in particular mixtures of water and additives, for example water/alcohol mixtures, upstream of the compressor or between two compressor blade rows. In the case of the spraying upstream of the compressor, the spraying arrangement is located upstream of the first compressor stage.

For reasons of simplicity and efficiency, in addition to atomizer nozzles assisted by auxiliary media, e.g. air-assisted atomizing nozzles, "airblast atomizers", pressure atomizer nozzles are often used for spraying water. During pressure atomization, the atomizing supply pressure can be kept approximately constant or varied only within narrow limits, since this can influence the droplet spectrum to a considerable extent. In order to vary the sprayed mass flow, nozzle groups are frequently switched on or off in this case. However, the abruptly changed setpoint mass flow can be provided by a pump or another delivery device only with a time delay. This is schematically illustrated in FIG. 1: if liquid is additionally admitted to a number of atomizer nozzles, a setpoint characteristic according to the curve identified by 2 results, assuming a uniform atomizing supply pressure. On account of the inertia of the pump, however, an actual characteristic according to 1 is obtained. This results in a temporary collapse of the atomizing supply pressure and a period in which droplets which are too large are produced.

A completely analogous situation occurs if a very rapid output gradient of the gas turboset is to be produced by an increased injection quantity, such as in frequency backup operation for example. In this case, the mass flow is increased more slowly than according to the setpoint selection, from which a delayed increase in output results. These problems equally occur when using pressure atomizer nozzles and atomizers assisted by auxiliary media.

SUMMARY

An apparatus and method are disclosed for non-intermittently and continuously delivering and introducing a liquid into a main flow which, when the mass flow to be introduced is changed, for example by switching on further nozzles, provides this changed mass flow essentially without a delay.

BRIEF DESCRIPTION OF THE DRAWINGS

The invention is explained in more detail below with reference to exemplary embodiments in connection with the drawings, in which.

DETAILED DESCRIPTION

Figure 1:
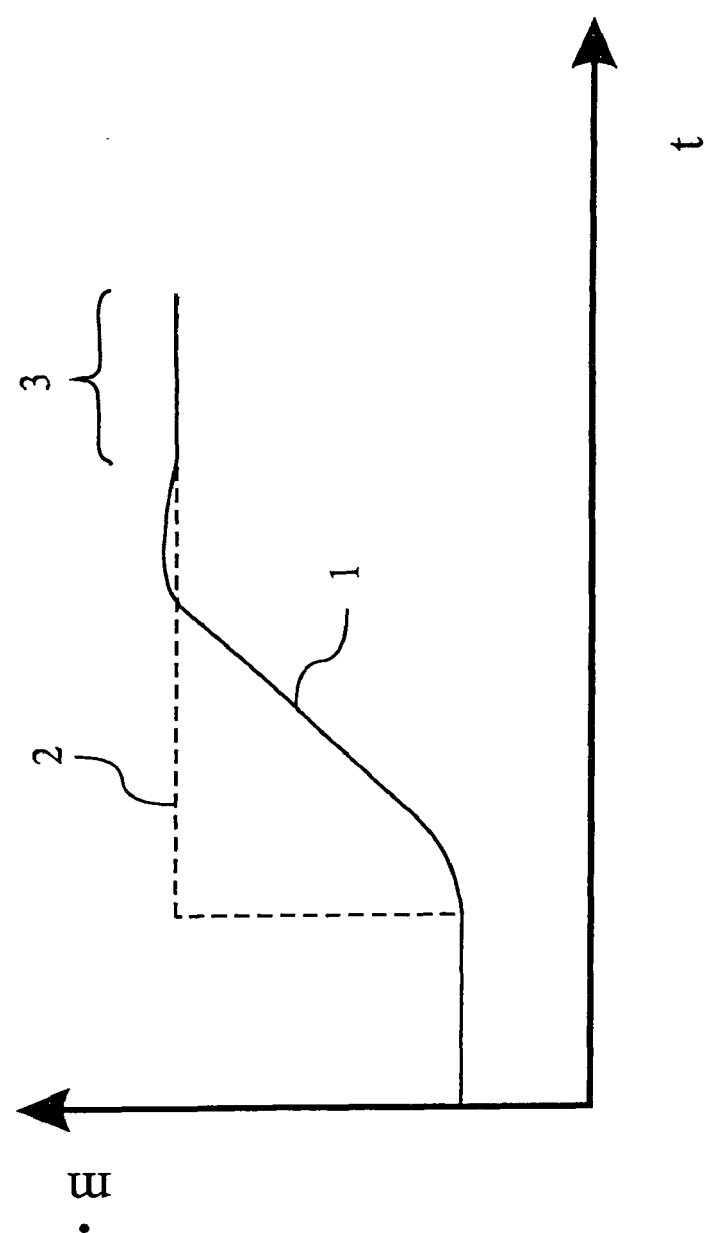
FIG. 1 shows a setpoint/actual-value plot of the characteristic of the water mass flow of a known pumping/delivery apparatus with respect to time.

An exemplary apparatus for continuously delivering and non-intermittently introducing a liquid into a main flow, such as a gas flow, comprises a supply line, a delivery line, a delivery device for delivering a mass flow of the liquid from the supply line to the delivery line, and at least one atomizing element communicating with the delivery line. Furthermore, a branch line which branches off from the delivery line can be arranged in the delivery direction downstream of the delivery device and upstream of the atomizing element, at least one changeover and/or regulating member for shutting off and/or throttling the branch line being arranged in combination with the branch line.

The nomenclature used within the scope of this description with regard to delivery apparatus and delivery device is to be explained at this point. In accordance with exemplary embodiments, the term "delivery device" refers to an element such as a pump or a system which delivers a liquid mass flow. The term "delivery apparatus" refers to the entire system including pipelines, regulating members, the delivery device and components of that kind.

A branch line can be arranged with a changeover and/or regulating member in such a way that at least some of the liquid mass flow delivered by the delivery device can be branched off via the branch line as required. It is thus possible to operate the delivery device in a constant, i.e. steady-state, manner even when the liquid mass flow to be atomized changes. The delivery device therefore delivers a constant liquid mass flow, whereas the liquid mass flow atomized via the atomizing element is variable. The delivery apparatus can enable the liquid mass flow which is fed to the atomizing element to be increased or reduced virtually without a time delay.

According to an advantageous configuration, the changeover and/or regulating member is a directional control valve which is expediently arranged at the branching point. According to one embodiment, the directional control valve is designed in such a way that the outlets can be cleared continuously, that is to say in an essentially infinitely variable manner. In this case, it may be perfectly expedient if the outlets of the directional control valve can only be operated independently of one another. For example, a control piston of the directional control valve can be displaceable in an infinitely variable manner and thus continuously. By displacing the control piston in one direction, the one outlet is increasingly opened up, whereas the other outlet is increasingly closed. Conversely, if the other outlet is increasingly opened up and the one outlet is increasingly closed, the control piston is moved in the other direction. According to another embodiment, a directional control valve having a discontinuous, binary changeover function is arranged as changeover and/or regulating member.

Furthermore, the changeover or regulating member may also be a shut-off element or a throttle element, for example a sliding element.

An exemplary apparatus can be suitable for use in a heat engine, in particular in an air-breathing internal combustion engine, for example a gas turboset. The at least one atomizing element communicating with the delivery line is preferably arranged in an inflow duct of the heat engine in order to introduce the liquid into the main flow of the heat engine. In accordance with the continuous working process of a gas turboset, the main flow flows continuously through the heat engine along a main flow path. It is thus also necessary to introduce the liquid non-intermittently into the main flow.

In particular for increasing the output of a gas turboset, the at least one atomizing element communicating with the delivery line is expediently arranged upstream of a compressor stage. Thus, for example, highly pure water can be introduced into the compressor of a gas turbine plant by means of the apparatus. In addition to water, however, the liquid which is introduced may be a mixture of water and a further additive or also another suitable liquid.

The expression "introducing a liquid" encompasses both to spraying or atomizing the liquid and to injecting the liquid into a main flow.

The liquid is introduced into the main flow non-intermittently, i.e. continuously. Accordingly, the atomizing element does not comprise any closure means for closing a passage opening of the atomizing element, through which passage opening the liquid is introduced into the main flow from the atomizing means. Such closure means are known from the prior art in order to be able to intermittently open the passage opening and close it again and in order thus to introduce the liquid intermittently into the main flow.

To introduce the liquid into the main flow non-intermittently by means of atomization, a continuous liquid mass flow can be provided for the atomization. In addition to providing a continuous liquid mass flow, it can be desirable, in particular when using pressure atomizer nozzles, to keep the liquid pressure applied in the delivery line upstream of the atomizing element largely constant over the period of introduction. Good atomization of the liquid via pressure atomizer nozzles over a continuous period is only ensured with a supply pressure which is constant over time. The optimum supply pressure is in this case to be selected in relation to the particular plant, in particular as a function of the atomizing means and the back pressure. If the supply pressure drops below this value, the liquid is only atomized inadequately.

In contrast, during intermittent atomizing or spraying of a liquid, the liquid pressure applied upstream of the atomizing element basically fluctuates in each case considerably about an average value as a result of each individual atomizing process. The process of intermittent atomizing or spraying of liquid is subdivided into at least three phases, namely a first phase, during which a passage opening of the atomizing means opens, liquid already passing through the opening-up passage opening here and being atomized. In a subsequent phase, atomizing is then effected with constantly open passage opening, although the supply pressure normally drops here. Finally, the passage opening is closed in a last phase of the intermittent atomization. A deviation of the supply pressure from an ideal supply pressure, in the case of intermittent spraying, therefore has a less pronounced effect on the quality of the atomization of the liquid than is the case with non-intermittent spraying.

In an exemplary apparatus the delivery device can be operated in a steady or virtually steady state, i.e. the delivery device continuously delivers liquid from the supply line into the delivery line. In this case, "continuous" means that the delivery device delivers no sudden changes in the mass flow. The mass flow provided by the delivery device therefore also remains virtually constant when atomizing means, for example nozzles or nozzle groups, are switched on or off and with an abruptly increased or reduced liquid mass flow rate which results therefrom. A slow increase or reduction in the delivery quantity of the delivery device following an abrupt change in the liquid mass flow rate, in order thus to adapt the current delivery quantity to the respectively required liquid mass flow rate and thus operate the delivery device in an adapted manner, can be used. The mass flow to be actually fed to the at least one atomizing means is set by a controlled diversion of the liquid mass flow, an excess quantity of which is delivered, via the branch line. For example, if the branch line is completely opened, a large proportion, in the extreme case the entire liquid mass flow delivered by the delivery device, flows into the branch line. The mass flow in the delivery line downstream of the branching point of the branch line is thus small. Conversely, if the branch line is completely closed, the entire liquid mass flow delivered by the delivery device remains in the delivery line and passes to the atomizing element. Depending on the degree of opening of the branch line, intermediate values of the mass flow distribution can also be set.

In order to change the mass flow of the liquid in the delivery line downstream of the branching point of the branch line, it is thus no longer necessary to change the operating point of the delivery device. This can constitute a significant advantage. The delivery device, which is expediently designed as a pump, can therefore be operated continuously independently of the mass flow required, i.e., for example, at constant speed. The delivery device can therefore be operated substantially more uniformly, without having to immediately comprehend steep gradients or even discontinuities in the mass-flow and/or pressure setpoints. A change in the setpoint mass flow and/or in the pressure in the delivery line in the direction of flow downstream of the branching point of the branch line can be effected by a change in the degree of opening of the branch line.

Such a change in the degree of opening can be carried out, for example by means of a sliding element, very quickly and thus approximately without a starting delay. Filling processes for filling the lines with water during pressure increase or even processes for emptying the lines during reduction in the pressure certainly still lead to slight reaction delays, but the latter are markedly reduced compared with, for example, starting and reaction times of a pump.

In an advantageous embodiment, the delivery device, during a change in the mass-flow and/or pressure setpoints, can be successively brought to an operating state adapted to the current output requirement. As a rule, it is to be taken into account here that the operating point of the delivery device can be selected in such a way that a mass flow greater than the mass flow atomized is always delivered. This means that a certain control margin is always available. If required, the mass flow can therefore be quickly increased at any time by utilizing this control margin. The size of the control margin to be selected is to be established in relation to the particular plant while taking into account the mass flow changes to be expected and from economic points of view.

To provide for successive adaptation of the operating state to changed output requirements, in an expedient configuration, a pressure measuring point for measuring the liquid pressure can be arranged in the delivery line downstream of the branching point. Furthermore, in this expedient configuration, a controller can be connected up to the measured pressure as controlled variable and to the position of the changeover and/or regulating member as manipulated variable. If the pressure applied in the delivery line downstream of the branching point drops, the controller regulates the position of the changeover and/or regulating member in such a way that a smaller proportion of the liquid mass flow is drawn off through the branch line. Conversely, if the pressure applied in the delivery line downstream of the branching point increases, the controller regulates the position of the changeover and/or regulating member in such a way that a larger proportion of the liquid mass flow is drawn off through the branch line.

In an alternative, expedient configuration, a measuring point for a liquid mass flow can be arranged in the delivery line downstream of the branching point. Furthermore, a controller can be connected up to the measured mass flow as controlled variable and to the position of the changeover and/or regulating member as manipulated variable. If the liquid mass flow in the delivery line downstream of the branching point drops below a setpoint, the controller regulates the position of the changeover and/or regulating member in such a way that a smaller proportion of the liquid mass flow is drawn off through the branch line. Conversely, if the liquid mass flow in the delivery line downstream of the branching point increases above the setpoint, the controller regulates the position of the changeover and/or regulating member in such a way that a larger proportion of the liquid mass flow is drawn off through the branch line.

In a further expedient configuration, a pressure measuring point is arranged in the delivery line. The pressure, measured by means of the pressure measuring point, in the delivery line is filtered by means of a high-pass filter and is then fed to a first pressure controller as controlled variable. The first pressure controller in turn regulates, as manipulated variable, the position of a regulating member arranged in the branch line. In addition, a second pressure controller is also connected up to the measured pressure, filtered via a low-pass filter, as controlled variable and to the position of an output controller of the delivery device. Sudden high-frequency changes of pressure, as occur, for example, when nozzles or nozzle groups are switched on or off, are applied to the controllable regulating member via the high-pass filter and lead here to the position of the regulating member being adapted in order to compensate for the sudden high-frequency changes of pressure. Conversely, low-frequency pressure changes act on the position of the output controller of the delivery device.

When a delivery apparatus is used in a liquid injection unit for spraying water into the compressor inflow duct of a gas turboset, very good atomization of the water can therefore be achieved over the entire operating range and also in the frequency backup range. In particular, when further atomizing elements, for example, are switched on in order to achieve the water mass flow to be sprayed, these atomizing elements being supplied with water via the same delivery line, a drop in the pressure in the delivery line on account of the increased demand for water mass flow can be avoided by an apparatus as described herein. As reaction time for reacting to switching-on of further atomizing elements, only the adjusting time of the changeover and/or regulating element is to be taken into account here. This reaction time, for example in the case of sliding elements, may lie within a range of less than one second or within the range of a few seconds, so that there is virtually no reaction delay here.

This applies both when using pressure atomizer nozzles as atomizing elements and in the case of atomizer nozzles assisted by auxiliary media, for example air-assisted atomizer nozzles, what are referred to as airblast atomizers. In this case, a plurality of atomizing nozzles are normally arranged in a respective nozzle carrier, the nozzle carrier being connected to the delivery line. Liquid can be admitted selectively to individual atomizing nozzles or groups of atomizing nozzles arranged on a nozzle carrier.

In an exemplary embodiment, the delivery line branches downstream of the branching point of the branch line into a plurality of individual delivery lines. In this case, each individual delivery line is connected to at least one atomizing element, for example a nozzle, or to a nozzle carrier provided with a plurality of atomizing elements. This enables a plurality of nozzles or nozzle groups to be supplied with liquid via only one delivery device, for example a pump. Here, therefore, the delivery line connected to the pump and the respectively relevant individual delivery line together form the delivery or service line for the connected nozzle element or the connected nozzle carrier. In addition, a shut-off member is arranged in at least one individual delivery line, preferably in each individual delivery line, so that the relevant individual delivery lines can each be individually opened up or closed completely or partly by means of the shut-off member.

In a further expedient configuration, the delivery line branches upstream of the branching point of the branch line into a plurality of individual delivery lines, at least one of the individual delivery lines being connected to an atomizing element. A branch line branches off in each case from at least one individual delivery line, for example, from each individual delivery line, and this branch line can expediently be at least partly closed in each case via a changeover and/or regulating member which is integrated in the individual delivery line or the individual branch line and is, for example, a shut-off or throttle element or a multiway control element. Furthermore, in an expedient manner, a shut-off member can be additionally arranged in each individual delivery line downstream of the point at which the branch line branches off from the delivery line. In an especially advantageous manner, all the changeover and/or regulating members can be operated selectively and individually. The delivery line connected to the pump and the respectively relevant individual delivery line together form in each case the delivery or service line for the connected nozzle element or the connected nozzle carrier.

If a pressure measuring point is to be provided in the delivery line for the successive adaptation of the operating state to changed output requirements according to the expedient embodiment described above, this pressure measuring point is to be expediently arranged downstream of the branching point when the delivery line is split up into a plurality of individual delivery lines. This permits joint control of the liquid pressure for all individual delivery lines. The same applies in the case of mass flow control.

In an exemplary apparatus having a developed pressure or mass flow control, a throttleable return line is arranged which branches off from the delivery line upstream of the point at which the delivery line branches into individual delivery lines, and the delivery device is designed to be controllable, for example as a variable-speed pump.

The branch line branching off from a delivery line can be designed with a clear cross section corresponding to, for example, 0.7 times to 1.5 times the cumulative cross sections of the openings of the atomizing elements attached to the respective delivery line, preferably 0.9 times to 1.2 times and in particular preferably equal to the cumulative cross sections. The clear cross section also relates to the changeover and/or regulating member integrated in the branch line, i.e. the clear cross section is calculated at the narrowest point within the branch line including the changeover and/or regulating member arranged in the branch line. Thus the branch line may also be designed with a relatively large clear cross section, provided a changeover and/or regulating member opens up a maximum clear cross section in the region specified.

Furthermore, according to one embodiment, a shut-off member, such as a 2/2-way directional control valve, is arranged downstream of the point at which the branch line branches off from the delivery line and upstream of a nozzle element in the delivery line. This shut-off member serves to close the delivery line in the direction of the nozzle element. If a plurality of nozzle elements or nozzle groups are connected to a delivery line, according to one embodiment, a shut-off member is arranged between the nozzle elements or nozzle groups in order to be able to selectively switch the nozzle elements or nozzle groups on or off.

The branch line can, for example, open again into the supply line. If the supply line is connected to a reservoir, for example to a water tank, the branch line advantageously opens into the reservoir. The liquid branched off from the delivery line via the branch line therefore recirculates and continues to be used again. Suitable means for recooling the circulated liquid are advantageously arranged in the circulation path. However, the liquid can in principle also be supplied for another useful purpose via the branch line.

In an exemplary configuration, the point at which the branch line branches off from the delivery line is designed as a T-element or a T-pipe element or as another tubular branching element. In this case, "T-element" denotes a branching element in which a branch element branches off from a main line. The angle between branch element and main line may be 90°, but need not necessarily be 90°.

When the branch line is designed as a T-element, a regulating member is arranged in the branch line in order to be able to at least partly close the branch line. According to one embodiment, the regulating member can be opened and closed in an infinitely variable manner. On account of their very quick response times, solenoid valves, for example, are suitable for use as regulating member.

Alternatively, the point at which the branch line branches off from the delivery line can be designed as a multiway control element, such as a 3/2-way directional control valve, in which the outlets can be opened and closed independently of one another. According to one embodiment, the outlets of the multiway control element can be opened and closed in an infinitely variable manner. In another embodiment, the point at which the branch line branches off from the delivery line is designed as a regulating member which enables the inflowing liquid mass flow to alternatively be fed to the atomizing element or directed into the branch line. This regulating member can be designed with a continuous or a discontinuous changeover function.

In a further expedient configuration, the changeover and/or regulating members and also expediently the further shut-off members are controlled from a central control unit. In this way, the changeover and/or regulating members and also the shut-off members can be activated synchronously and in such a way as to be matched to one another. The central control unit in turn can communicate with a higher-level controlling unit, for example a central controlling unit of the gas turboset, or may be designed as part of this controlling unit.

An exemplary method is also disclosed of continuously delivering and non-intermittently introducing a liquid mass flow into a main flow, specifically of a heat engine. The method is suitable in particular for operating the apparatus according to the invention. The liquid mass flow is continuously delivered by a delivery device, in which case at least some of the liquid mass flow delivered by the delivery device can be branched off in the delivery direction downstream of the delivery device. To increase or reduce the liquid mass flow, to be introduced into the main flow, by a differential mass flow, the liquid mass flow delivered by the delivery device is kept constant and the branched-off liquid mass flow is changed by a differential mass flow of approximately the same magnitude or, in an expedient embodiment, by a differential mass flow of the same magnitude but with opposite sign.

An exemplary method enables the liquid mass flow which is to be introduced into the main flow to be increased or reduced by a differential mass flow virtually without a time delay. Such an instantaneous increase or reduction in the liquid mass flow to be introduced into the main flow is desirable, for example, when nozzles or nozzle groups, via which the liquid is introduced into the main flow, are switched on or off.

Even if the liquid mass flow delivered by the delivery device is kept constant or virtually constant according to the invention during a change in the liquid mass flow to be introduced, in immediate reaction to the changed mass flow requirement, and brief adaptation is achieved via a change in the liquid mass flow branched off, a slow increase or reduction in the delivery flow following an abrupt change in the liquid mass flow to be introduced into the main flow is nonetheless included within the scope of the invention. By a slow increase or reduction in the delivery quantity, the liquid mass flow delivered by the delivery device can be adapted to the respectively required liquid mass flow rate to be introduced. By this readjustment of the current delivery quantity in each case, in accordance with the required liquid mass flow actually fed to the atomizing elements, it is possible to keep the control margin, as the liquid mass flow delivered in excess by the delivery device, within the limits of the requisite system dynamics.

In an advantageous method, a pressure in the delivery line is continuously measured downstream of the branching point, and this pressure is regulated via the branched-off liquid mass flow. In this case, it can be expedient to constantly regulate the pressure in the delivery line as nozzle supply pressure.

In a further advantageous method, the liquid mass flow is measured downstream of the branching point, and this liquid mass flow is regulated via the branched-off liquid mass flow.

In a further advantageous method, a pressure in the delivery line is measured, the measured pressure is filtered with a high pass and the high-pass-filtered pressure is regulated via the branched-off liquid mass flow. In addition, the measured pressure is filtered with a low pass and the low-pass-filtered pressure is regulated via the liquid mass flow delivered by the delivery device.

In an expedient method, the branched-off liquid mass flow is conducted in a branch line. The branched-off liquid mass flow is then expediently regulated via the position of a regulating member in the branch line.

One or more nozzle groups and/or one or more nozzles can be expediently switched on or switched off for changing the liquid mass flow by the differential mass flow.

According to an exemplary embodiment, the setpoint of the liquid mass flow and/or the number of nozzle tubes to which liquid is admitted are/is set by an output controller of a prime mover.

If an exemplary method is used for the operation of a stationary gas turbine with water injection in the compressor inlet region, according to an expedient method, a differential mass flow of 20% of the maximum liquid mass flow to be atomized can be made available in less than 3 seconds, preferably in less than 1 second, for the injection. That is to say that, according to this embodiment, the control margin, as the mass flow conducted via the branch line, is 20% of the maximum mass flow to be sprayed.

In an expedient configuration of the method, the delivery line can be closed in the delivery direction downstream of the point at which the branch line branches off from the delivery line. When the delivery line is opened, the branch line is at the same time advantageously closed by an equivalent proportion. Conversely, when the delivery line is completely or partly closed, the branch line is opened by an equivalent proportion. The equivalent proportion results from the differential mass flow to be controlled. By means of synchronous, equivalent closing of the branch line during opening of the delivery line, and vice versa, the degree of throttling for the pump remains virtually constant. The pump therefore experiences no change in the operating point. The liquid quantity which is branched off through the branch line is also split up virtually linearly relative to the liquid quantity passed on in the delivery line, as a function merely of the opening ratio of the branch line to the delivery line. The liquid mass flow which is provided for the nozzles or nozzle groups can therefore be set approximately linearly via the opening ratio of the branch line to the delivery line.

In the following discussion of exemplary embodiments, only the elements and components which are essential for the understanding of the embodiments are shown in the figures. The exemplary embodiments shown are to be understood as purely instructive and are to serve for better understanding but not for restriction of the subject matter of the invention.

A setpoint/actual-value plot of the water mass flow of a conventional pumping delivery apparatus is shown against time in FIG. 1. The setpoint selection 2 is shown as a sudden change of mass flow by a broken line. Like a delayed step response, the actual mass flow 1 follows the setpoint selection 2 with a marked time delay. The time delay is due to the fact that the pump of the conventional pumping/delivery apparatus cannot deliver an increased mass flow at any desired speed. It is not until after some time (time range 3) that the desired mass flow occurs. If such a pumping/delivery apparatus is used in a water injection unit of a gas turbine using pressure atomizer nozzles as atomizing elements, the pump, when nozzles or nozzle groups are switched on, delivers an inadequate water mass flow on account of the starting delay after the switch-on. On account of the associated pressure drop in the delivery line, the sprayed or injected water is not atomized in an optimum manner during atomization by means of pressure atomizer nozzles. In atomizer nozzles, the supply pressure is normally not varied or is only varied within small limits. Nozzles or nozzle groups are therefore switched on and off in order to set different mass flows. This leads to abruptly changed demands on the mass flow quantity, a factor which, on account of the mass-flow/pressure correlation and the limited capacity of the pump to provide any desired mass flow gradients, ultimately leads to undesirable pressure fluctuations in the delivery line.

The limited mass flow gradient may also be problematical in air-assisted atomizers, since it is precisely the mass flow that is changed more slowly than would be necessary, for example, for achieving a required output gradient of the gas turbine. On account of the inertia of the pump, the pumping/delivery capacity does not assume the desired value until after some time. It is only after this instant that sufficient water is provided by the pump. Accordingly, the desired increase in output is also effected only in a delayed manner during operation of the gas turbine, for example for frequency backup.

Figure 2:
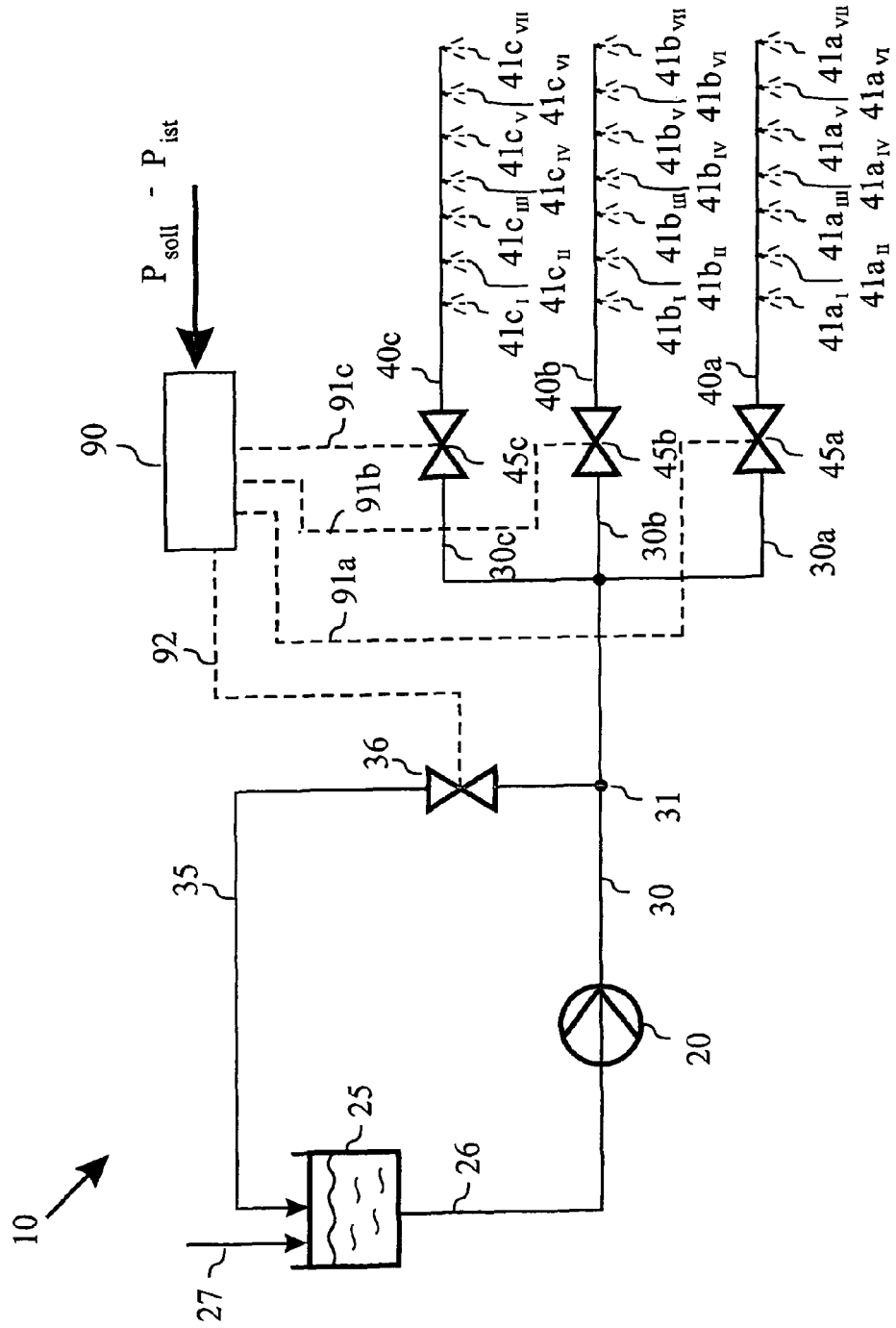
FIG. 2 shows a first exemplary embodiment of a delivery apparatus.

FIG. 2, in a schematic illustration, shows a first embodiment of the apparatus for delivering and atomizing a liquid, this apparatus providing a changed mass flow virtually instantaneously. The apparatus 10 shown is suitable, for example, for use in a liquid injection unit for the non-intermittent spraying and injection of water into a compressor flow of a gas turbine plant.

The apparatus 10 comprises a pump 20 which communicates with a supply tank 25 via a supply line 26 and draws in liquid from said supply tank 25 and pumps it continuously into a delivery line 30. The supply tank 25 is filled with liquid, for example highly pure demineralized water, continuously or as required via a feed line 27.

In the delivery direction downstream of the pump 20, a branch line 35 for drawing off at least some of the liquid delivered by the pump branches off from the delivery line 30. The branch line feeds the branched-off water back into the supply tank 25. In a most advantageous manner, means for cooling the recirculated fluid are arranged in the branch line.

The point at which the branch line 35 branches off from the delivery line 30 is designed as a simple T-pipe element 31. Furthermore, a 2/2-way directional control valve 36 is arranged as changeover and/or regulating member in the branch line 35, and this 2/2-way directional control valve 36 can be opened and closed in an infinitely variable manner in order thus to open up a variable cross section of flow. However, the branch line 35 can also be completely closed by means of the 2/2-way directional control valve 36, so that no liquid can flow back from the delivery line 30 into the supply tank 25.

In the direction of flow downstream of the point 31 at which the branch line 35 branches off from the delivery line 30, the latter is subdivided into three individual delivery lines 30$a$, 30$b$ and 30$c$. Each individual delivery line 30$a$, 30$b$, 30$c$ is connected to a nozzle group 40$a$, 40$b$, 40$c$. Each of the nozzle groups 40$a$, 40$b$, 40$c$ shown in FIG. 2 has in each case 7 nozzle openings 41$a_\text{I}$, 41$a_\text{II}$, . . . 41$a_\text{VII}$; 41$b_\text{I}$, 41$b_\text{II}$, . . . 41$b_\text{VII}$;

$41c_I$, $41c_{II}$, ... $41c_{VII}$, via which the water is sprayed or injected into a compressor flow; this number must of course not be understood as restrictive.

The arrangement of the nozzle groups $40a$, $40b$, $40c$ on nozzle tubes is reproduced schematically in FIG. 2. These nozzles groups may also be arranged, for example, on concentric rings. Likewise, the cross sections of flow of the individual feed lines for the nozzle groups may also differ from one another and may also vary in the direction of flow.

Furthermore, as shown in FIG. 2, a shut-off member, here a respective 2/2-way directional control valve $45a$, $45b$, $45c$, is arranged in each individual delivery line $30a$, $30b$, $30c$, which shut-off member can in each case be completely opened and closed and can in this case also be additionally brought into intermediate positions in an infinitely variable manner in order to set the mass flow to the respective atomization elements or the respective nozzle group. This embodiment is advantageous when, for example, using atomizer nozzles assisted by auxiliary media, in particular air-assisted atomizer nozzles. On the other hand, when using pressure atomizer nozzles, it is sufficient and even extremely expedient if the 2/2-way directional control valves are shut-off members which act discontinuously and which only have an open and a closed position. Intermediate positions for throttling the delivered liquid mass flow are then not necessary.

By means of the 2/2-way directional control valves, the individual delivery lines $30a$, $30b$, $30c$ are closed, for example, during the initial run-up of the pump to speed in order to first of all build up a sufficient supply pressure in the delivery line 30 before the spraying of the liquid is started.

During operation of the apparatus, individual nozzle groups can be switched on or switched off by means of the 2/2-way directional control valves. In particular when using pressure atomizer nozzles, in which the supply pressure is only to be varied within small limits, this constitutes a common method of increasing or reducing the mass flow to be sprayed. This switching-on or switching-off of nozzles or nozzle groups makes it necessary to provide an abruptly changed mass flow.

On account of the mass-flow/pressure correlation and the limited capacity of the pump to provide any desired mass flow gradients, this leads to pressure fluctuations in the delivery line, which are undesirable in particular when using pressure atomizer nozzles. However, the limited mass flow gradient may also be problematical in air-assisted atomizers, since it is precisely the mass flow that is changed more slowly than would be necessary, for example, for achieving an output gradient of a gas turbine plant.

Furthermore, all the throttling and shut-off members 36, $45a$, $45b$, $45c$ are controlled via control lines $91a$, $91b$, $91c$, 92 from a central control unit 90 and can thus be synchronously activated and adjusted. As shown here, an input variable for the central control unit 90 is, for example, a deviation of the output of a gas turbine plant. If the setpoint output $P_{setpoint}$ is greater than the actual useful output $P_{actual}$ of the gas turbine, the water spraying is increased here via the central control unit by switching on a nozzle group; i.e. the relevant 2/2-way directional control valve $45a$, $45b$ or $45c$ is opened. Conversely, if the actual output is to be reduced, the spraying of water via one or more of the nozzle groups $41a$, $41b$, $41c$ is switched off by closing the relevant 2/2-way directional control valve $45a$, $45b$ or $45c$.

At the same time as one or more nozzle groups are switched on or off, the infinitely adjustable regulating member 36 is activated by the central control unit 90 and either opened or closed in such a way that a changed atomizing mass flow is compensated for by the mass flow change in the diversion line. The position of the regulating member 36 can be changed in such a way that the mass flow recirculated via the branch line 35 is changed in magnitude in accordance with the change in the sprayed mass flow, but in the process with opposite sign. Thus the mass flow delivered by the pump 20 remains constant.

According to the exemplary embodiment shown, the setpoint output values and the actual output values are fed to the control unit 90 from a gas turbine control. From these preset setpoint and actual output values, the control unit 90 determines control signals for the spraying. Alternatively, from a deviation of the output or also from measured temperature and pressure values, the gas turbine control can determine a setpoint mass flow or a mass flow delta for the mass flow to be atomized, this setpoint mass flow or mass flow delta then passing as input variable to the control unit 90.

Figure 3:
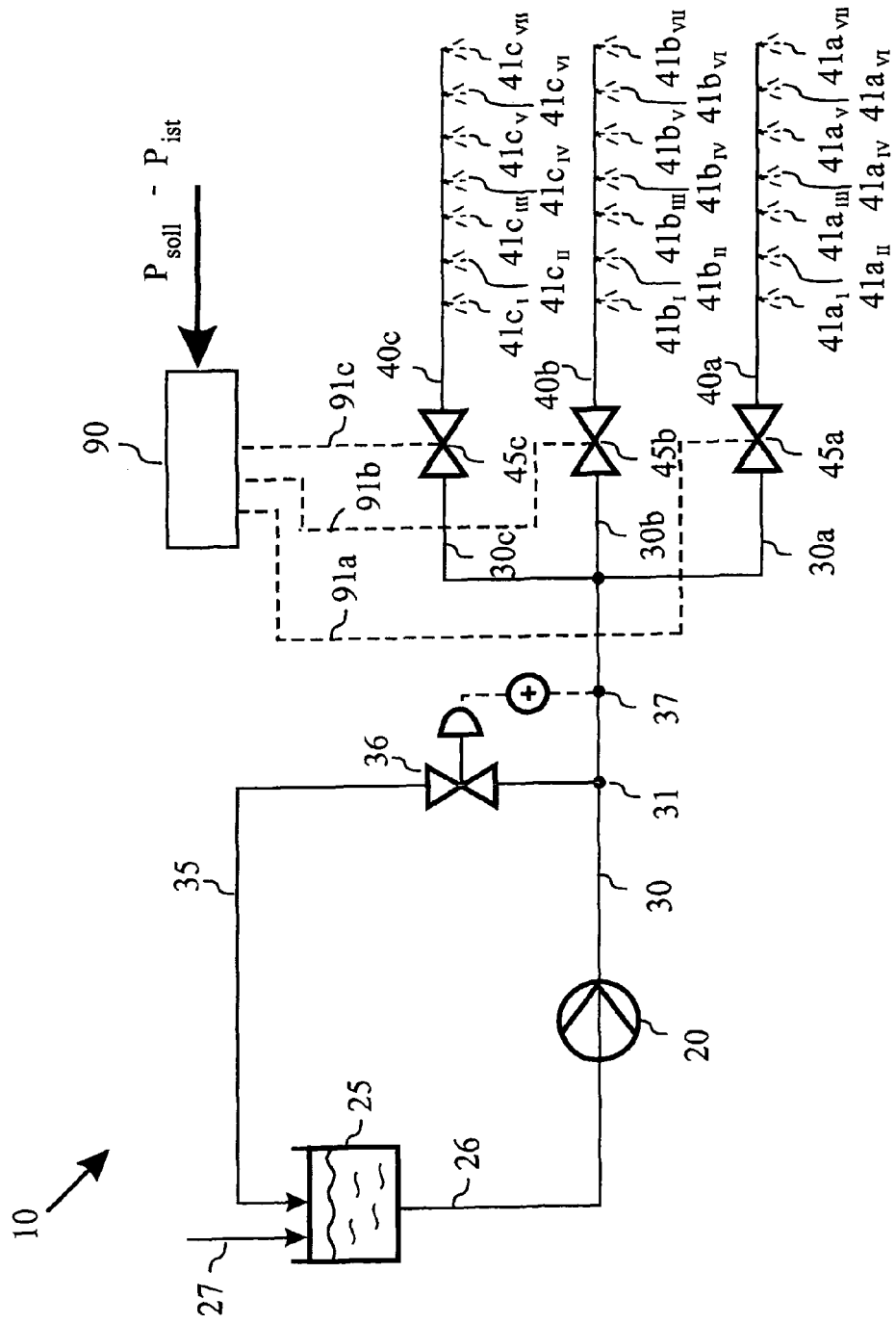
FIG. 3 shows the delivery apparatus from FIG. 2 with an exemplary integrated pressure control.

Whereas the shut-off valve 36 according to FIG. 2 is activated from a central control unit, the regulating member 36 in the embodiment according to FIG. 3 is activated via an integrated pressure control of the delivery line pressure. To this end, a pressure measuring point 37 for measuring the liquid pressure in the delivery line is arranged in the delivery line downstream of the point at which the branch line branches off from the delivery line. The regulating member 36, which in the present case is designed as a pressure control valve (illustration in FIG. 3 according to DIN 2481), is actuated as a function of the measured pressure.

If the measured pressure is below the pressure setpoint, the regulating member 36 is closed to such an extent and the liquid quantity flowing through the branch line 35 thereby reduced to such an extent that the measured pressure corresponds to the pressure setpoint. Conversely, if the measured pressure is above the pressure setpoint, the regulating member 36 is opened further. The liquid pressure applied in the delivery line downstream of the branching point is therefore regulated in an integrated manner without external control intervention. The pump 20 continues working at a steady-state operating point.

Figure 4:
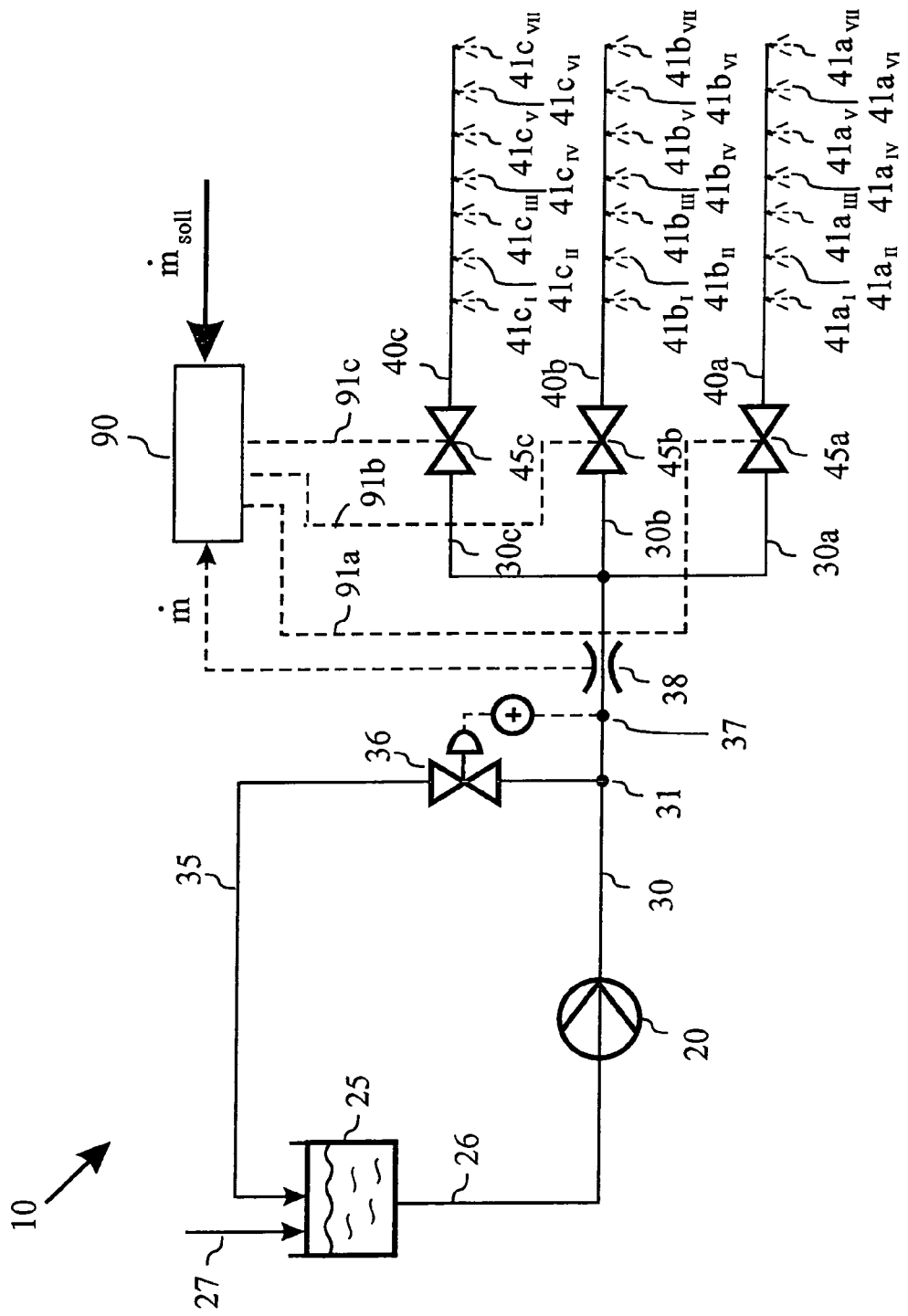
FIG. 4 shows the delivery apparatus from FIG. 2 with an exemplary explicit mass flow control.

In the embodiment according to FIG. 4, the individual nozzle groups are activated with the liquid mass flow to be sprayed, instead of with an output, as controlled variable. To this end, a mass-flow measuring point 38 which detects the injection mass flow is arranged in the delivery line downstream of the branching point of the branch line and upstream of the branching into the individual delivery lines. The detected measured variable is compared in the control unit with a mass flow setpoint $m_{setpoint}$. If the actual value is below the setpoint, one of the regulating members $45a$ to $45c$ is opened. If the actual value is above the setpoint, one of these regulating members is closed. During these control processes, the pressure in the inflow line is measured at the pressure measuring point 37 and is regulated to a constant value in the manner described above by interventions at the regulating member 36.

Here, the delivery devices of the exemplary embodiments shown in FIGS. 2, 3 and 4 of the delivery apparatus are in each case designed as pumps 20 and are operated essentially continuously. That is to say that the pumps continuously deliver water from the feed lines 26 into the delivery lines 30, in each case at a constant pump speed, irrespective of the liquid mass flow actually to be sprayed and of the liquid mass flow thus to be provided.

However, a mode of operation of the delivery device can be provided in which the delivery output of the delivery device is readjusted slowly when the mass flow to be sprayed is changed (changed demand). However, the readjustment can be effected over a markedly longer period than the period of the change in demand. The respective pump 20 is therefore to be run up to speed essentially only once to a rated operating point.

During the run-up of the pump 20 to speed, the shut-off members 45a, 45b, 45c of the individual delivery lines 30a, 30b, 30c are closed to begin with. Thus no liquid passes to the nozzle groups 40a, 40b, 40c during the run-up of the pump to speed. On the other hand, the regulating member 36 of a branch line 35 is open during the run-up of the pump 20 to speed. The liquid delivered by the pump 20 into the delivery line 30 can therefore recirculate via the branch line 35. The atomizing arrangement is accordingly ready for operation to the full extent.

After the run-up to speed, the pump 20 can deliver a sufficient liquid mass flow at a constant supply pressure sufficient for good atomization. From this instant, the shut-off members 45a, 45b, 45c of the individual delivery lines 30a, 30b, 30c can be opened partly or also completely, individually or jointly, according to demand and in accordance with an operating concept to be specifically preset and the spraying of liquid via the nozzle openings 41aI, 41aII, ... 41aVII; 41bI, 41bII, ... 41bVII; 41cI, 41cII, ... 41cVII of the nozzle groups 40a, 40b, 40c can be started. Apart from during a short period in which the feed line of the respectively switched-on nozzle group 40a, 40b, 40c is filled with liquid to begin with, the spraying via the respectively switched-on nozzle group is started virtually at once, i.e. virtually without a starting delay.

If the spraying of liquid via one or more of the individual delivery lines 30a, 30b, 30c is started, the regulating member 36 of the branch line 35 is at least partly closed in order to at least reduce the recirculation of water from the delivery line 30 into the supply tank 25.

In the process, in an especially advantageous manner, the regulating member 36 is closed and the recirculation of liquid thereby reduced precisely to such an extent that the supply pressure in the delivery line 30 remains constant or virtually constant even after the opening of the shut-off members 45a, 45b, 45c of the individual delivery lines 30a, 30b, 30c at an essentially constant delivery mass flow of the pump 20. This can be approximately achieved in a simple manner by blocking a cross section of flow in the branch line 35, by closing the regulating member 36 of the branch line 35, to the same extent as a cross section of flow in the individual delivery lines 30a, 30b, 30c is opened up, by opening the shut-off members 45a, 45b, 45c of the individual delivery lines 30a, 30b, 30c, in such a way that the change in the sprayed mass flow is compensated for in terms of magnitude by the change in the recirculated mass flow.

If the sprayed or injected liquid mass flow is to be increased in a further step, one or more nozzles or nozzle groups are switched on. With the switching-on of the nozzle groups, a greater liquid mass flow overall is suddenly required. This is provided by the regulating member 36 of the branch line 35 being closed further in synchronism with the switching-on of the nozzle groups and thus by less liquid being recirculated through the branch line 35. As a result, the mass flow in the delivery line 30 downstream of the branching point 31 and in the region of the atomizer nozzles is abruptly increased.

To increase the sprayed mass flow, the mass flow delivered by the pump 20 can be increased, which can be effected with a time delay. Conversely, during a reduction in the liquid mass flow to be sprayed in the delivery line 30 downstream of the branching point 31, the regulating member 36 of the branch line 35 is partly or completely opened, so that a greater liquid mass flow recirculates through the branch line 35.

Figure 5:
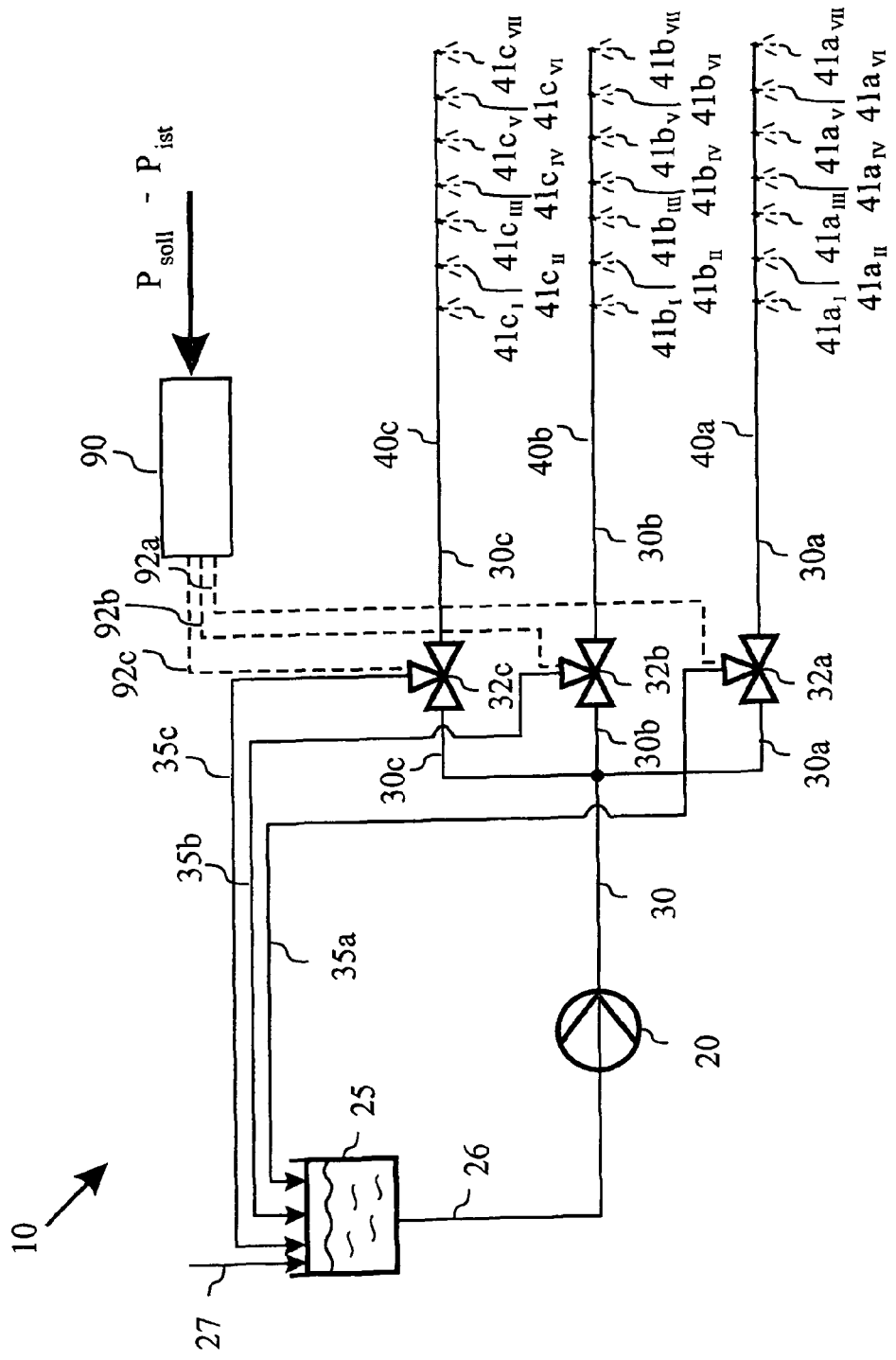
FIG. 5 shows a second exemplary embodiment of the delivery apparatus.

A further embodiment of the delivery apparatus is shown schematically in FIG. 5. In the apparatus according to the example shown in FIG. 5, each of the individual delivery lines 30a, 30b, 30c has a branch line. The individual branch lines 35a, 35b and 35c are connected to the individual delivery lines 30a, 30b and 30c by means of 3/2-way regulating members 32a, 32b and 32c. The 3/2-way regulating members enable a liquid mass flow delivered by the delivery device, here the pump 20, to be directed either to the atomizing elements 41 or into the branch lines. This may be realized as a continuous or discontinuous changeover function.

If the atomizing elements 41 are pressure atomizer nozzles, an intermittent changeover function can be used, in which the partial mass flow of an individual delivery line flows entirely to either the atomizing elements or the branch line. In the case of a continuous changeover, the partial mass flow can be split up; this can be used in combination with atomizers assisted by auxiliary media.

Each individual delivery line 30a, 30b, 30c again serves to feed a nozzle group 40a, 40b, 40c. Each nozzle group 40a, 40b, 40c comprises in each case 7 nozzle openings 41aI, 41aII, ... 41aVII; 41bI, 41bII, ... 41bVII; 41cI, 41cII, ... 41cVII. It is also possible to arrange throttle elements in each case downstream of the changeover members 32a, 32b and 32c and upstream of the nozzles, these throttle elements enabling the atomizing supply pressure of the nozzle groups to be set individually. The regulating members—directional control valves—are controlled via control lines 92a, 92b, 92c from a central control 90 in order to correct, for example by means of the sprayed liquid quantity, the deviation $P_{setpoint}$-$P_{actual}$ of the output of a prime mover in whose inflow duct the atomizer nozzles are arranged. Both the start of the water spraying and an abrupt increase or reduction in the water quantity to be sprayed can also be effected in this embodiment virtually instantaneously by changing over the 3/2-way regulating members 32a, 32b and 32c.

Figure 6:
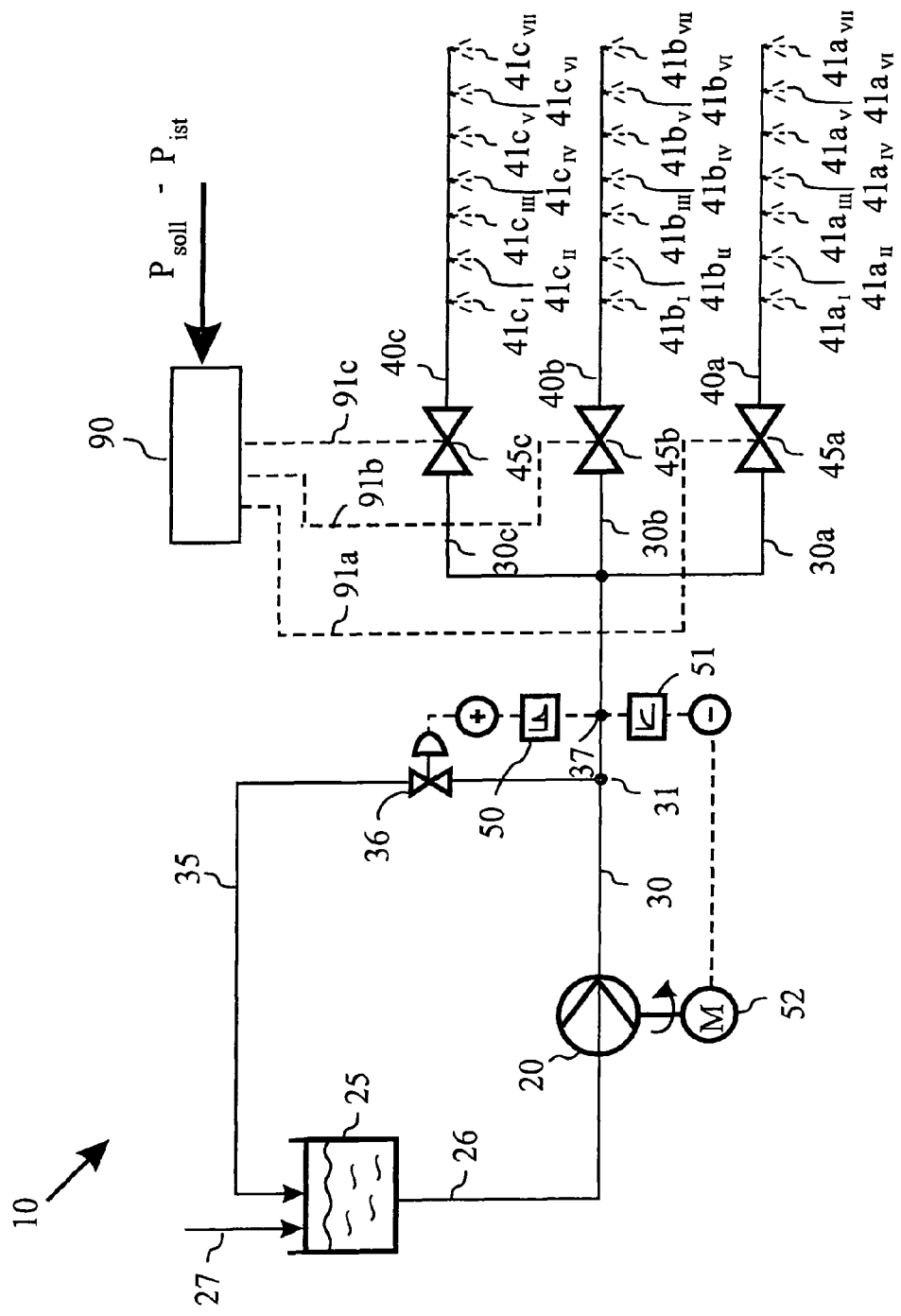
FIG. 6 shows a first exemplary delivery apparatus with a developed pressure control.
Figure 7:
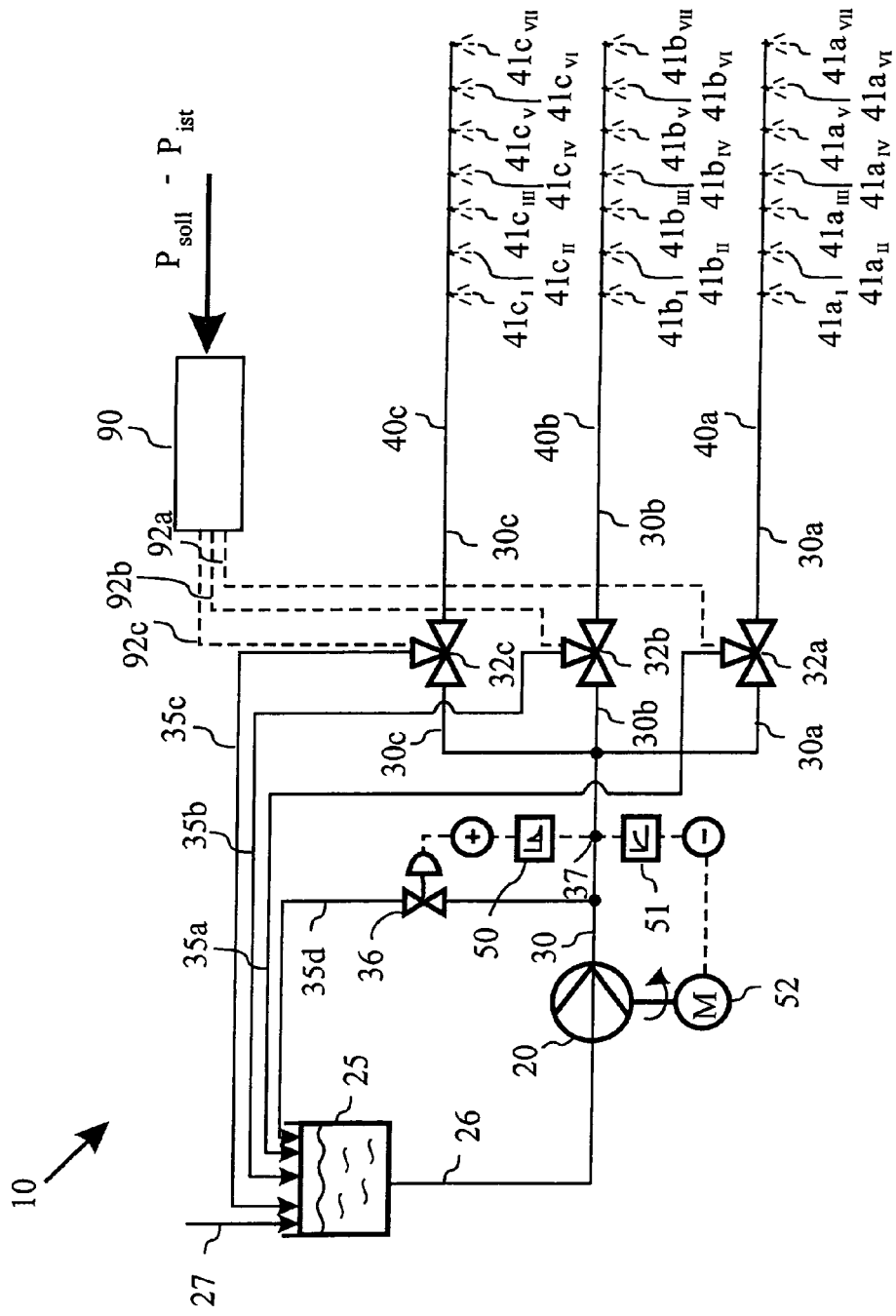
FIG. 7 shows a second exemplary delivery apparatus with a developed pressure control.

FIGS. 6 and 7 show further embodiments of the delivery apparatus, having an expediently developed control of the atomizing supply pressure. According to FIG. 6, fluid is selectively admitted to the nozzle groups via shut-off members 45a, 45b and 45c. The branch line 35 branches off from the delivery line 30 upstream of the point at which the delivery line 30 branches into the individual delivery lines 30a, 30b, 30c. The liquid mass flow conducted in the branch line 35 can be regulated via the regulating member 36, which in the present case is designed as a pressure control valve for regulating the pressure at the pressure measuring point 37.

In this case, the regulating member 36 is activated via a high-pass filter 53 in such a way that the input variable of the pressure control effected via the regulating member 36 are rapid changes in the pressure applied at the measuring point 37. Furthermore, the pressure measuring signal is directed via a low-pass filter 54 to a variable-speed drive 55 of the pump 20. In this control, the drive speed is increased if the low-pass-filtered pressure measured value drops, and conversely, during increasing pressure, the drive speed is reduced.

According to this embodiment, therefore, the pressure measured at the pressure measuring point 37 serves as controlled variable, on the one hand via the high pass 50 for adjusting the regulating member 36, and on the other hand via the low pass 51 for regulating the speed of the pump. The regulating member 36 therefore rapidly corrects high-frequency pressure fluctuations, as are caused, for example, when nozzles, nozzle groups 41a, 41b or 41c are switched on and off.

In contrast, low-frequency pressure fluctuations, i.e. pressure fluctuations over a longer period, are corrected by the pump. If a nozzle or a nozzle group is now switched on or also switched off, the regulating member 36 reacts very quickly to the change and immediately provides an increased liquid mass flow for the atomizer nozzles. The abruptly changed mass flow requirement acts on the variable-speed drive 52 of the pump 20 via the low-pass filter.

Thus the circuit connection leads to the pump delivering an increased or reduced water mass flow for a longer period. The regulating member 36 can therefore assume the original initial position again for a longer period. In this case, a certain opening of the regulating member 36 can be preset as setpoint in such a way that a certain mass flow always recirculates in steady-state operation. In this sense, changes in the liquid mass flow to be sprayed are comprehended in a delayed manner by the pump with variable-speed drive.

In this case, the opening of the regulating member 36 ensures that the pump, in steady-state operation, always delivers a greater mass flow than is actually sprayed. This excess mass flow is available as a control margin which, during an abrupt increase in the mass flow to be sprayed, can be briefly made available for the spraying by closing the regulating member 36. To change the liquid mass flow sprayed, one of the shut-off members 45a, 45b and 45c is opened or closed. On account of the correlation between pressure and mass flow, this leads to an abrupt change in the pressure at the measuring point 37. If a shut-off member is opened, the pressure drops abruptly with an unchanged mass flow.

On account of the high-pass filtering of the measuring signal, the regulating member 36 reacts immediately to the change and is closed further. Thus less liquid flows off via the outflow line 35 and thus the mass flow and ultimately the pressure in the delivery line 30 downstream of the branching point 31 increase. The drive 52 of the pump reacts only slowly on account of the low-pass filtering. On account of the high-pass filtering of the pressure measuring signal, the regulating member 36 returns slowly again into its initial position. The slow pressure drop caused as a result, on account of the high-pass filtering, does not act on the regulating member 36, or only has a slight effect on the regulating member 36, but is able to act on the variable-speed drive 52 of the pump 20 via the low-pass filtering. The speed of the pump 20 is increased, and the total mass flow delivered at the same pressure increases, a mass flow which exceeds that delivered for spraying again being delivered in steady-state operation. The excess mass flow is recirculated via the branch line 35 and is available as a control margin for a rapid reaction. Conversely, if a shut-off member is closed, the pressure increases abruptly with unchanged mass flow.

On account of the high-pass filtering of the measuring signal, the regulating member 36 reacts immediately to the change and is opened further. Thus more liquid flows off via the outflow line 35, and thus the mass flow and ultimately the pressure in the delivery line 30 downstream of the branching point 31 decrease. The drive 52 of the pump reacts only slowly on account of the low-pass filtering. On account of the high-pass filtering of the pressure measuring signal, the regulating member 36 returns again slowly into its initial position. The slow pressure increase produced as a result, on account of the high-pass filtering, does not act on the regulating member 36, or has only a slight effect on the regulating member 36, but is able to act on the variable-speed drive 52 of the pump 20 via the low-pass filtering. The speed of the pump 20 is reduced, and the total mass flow delivered at the same pressure and thus the power consumption of the pump drive drop.

The pressure control shown in FIG. 6 can ensure that, on the one hand, the pump works at an operating point at which it delivers a mass flow which permits an immediate and spontaneous increase in the liquid mass flow to be sprayed and, on the other hand, the power consumption of the pump is limited for providing backup.

FIG. 7 illustrates this pressure control in the context of an apparatus which is shown in FIG. 5 and described above and in which each individual delivery line 30a, 30b, 30c of a nozzle group is connected to a diversion line. To this end, a further branch line 35d branches off from the delivery line 30 upstream of the point at which the delivery line 30 branches into the individual delivery lines 30a, 30b, 30c. The further branch line 35d opens into the reservoir 25.

Furthermore, an infinitely variable regulating member 36, by means of which the branch line 35d can be opened and closed in an infinitely variable manner, is integrated in the branch line 35d. In addition, a pressure measuring point 37, with which the liquid pressure in the delivery line 30 is measured, is arranged downstream of the point at which the further branch line 35d branches off from the delivery line 30. A high-pass filter 50 on the one hand and a low-pass filter 51 on the other hand are connected to this pressure measuring point 37. The output of the high-pass filter 50 is connected to the regulating member 36 designed as a pressure control valve. Via the low-pass filter 51, the measured pressure signal acts on a variable-speed drive 52 of the pump 20.

The pressure measured by the pressure measuring point 37 therefore serves as a controlled variable, on the one hand via the high pass 50 for adjusting the regulating member 36 and on the other hand via the low pass 51 for regulating the speed of the pump. The regulating member 36 therefore corrects high-frequency pressure fluctuations, as are caused, for example, when nozzles or nozzle groups 41a, 41b or 41c are switched on and off.

In contrast, low-frequency, i.e. pressure fluctuations over a longer period, are corrected by the pump. If a nozzle or a nozzle group is now switched on or also switched off, a changed liquid mass flow is first of all corrected very quickly via the further branch line 35d and the regulating member 36. However, the liquid demand changed over a longer period is also applied to the drive 52 of the pump 20 via the low-pass filter 51 and leads here to a change, i.e. an increase or reduction, in the pump speed. Thus the circuit connection leads to the pump delivering an increased or reduced liquid mass flow for a longer period. As described above, the regulating member 36 can therefore assume the original initial position again for a longer period.

Figure 8:
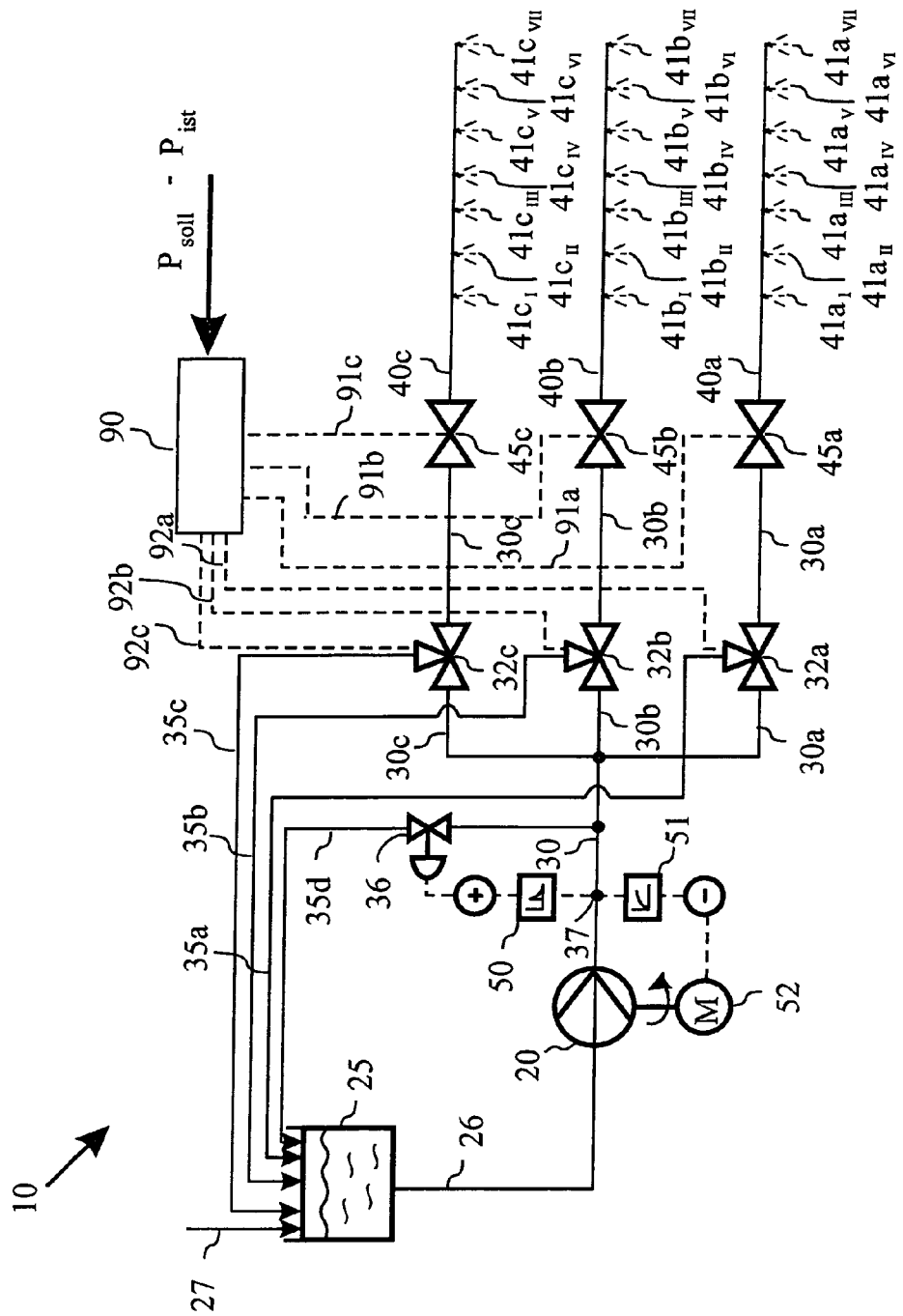
FIG. 8 shows a third exemplary delivery apparatus with a developed pressure control.

A further exemplary delivery apparatus having a pressure control developed in a similar manner to FIG. 7 is shown in FIG. 8. In contrast to the embodiment shown in FIG. 7, the pressure measuring point 37 in the delivery apparatus shown in FIG. 8 lies upstream of the point at which the branch line 35d branches off from the delivery line 30. Here, too, the pressure measured by the pressure measuring point 37 again serves as a controlled variable, on the one hand via the high pass 50 for adjusting the regulating member and on the other hand via the low pass 51 for controlling the speed and thus the delivery quantity of the pump 20. Furthermore, in the delivery apparatus shown in FIG. 8, a respective shut-off element 45a, 45b and 45c is additionally arranged in each individual delivery line 30a, 30b, 30c.

Figure 9:
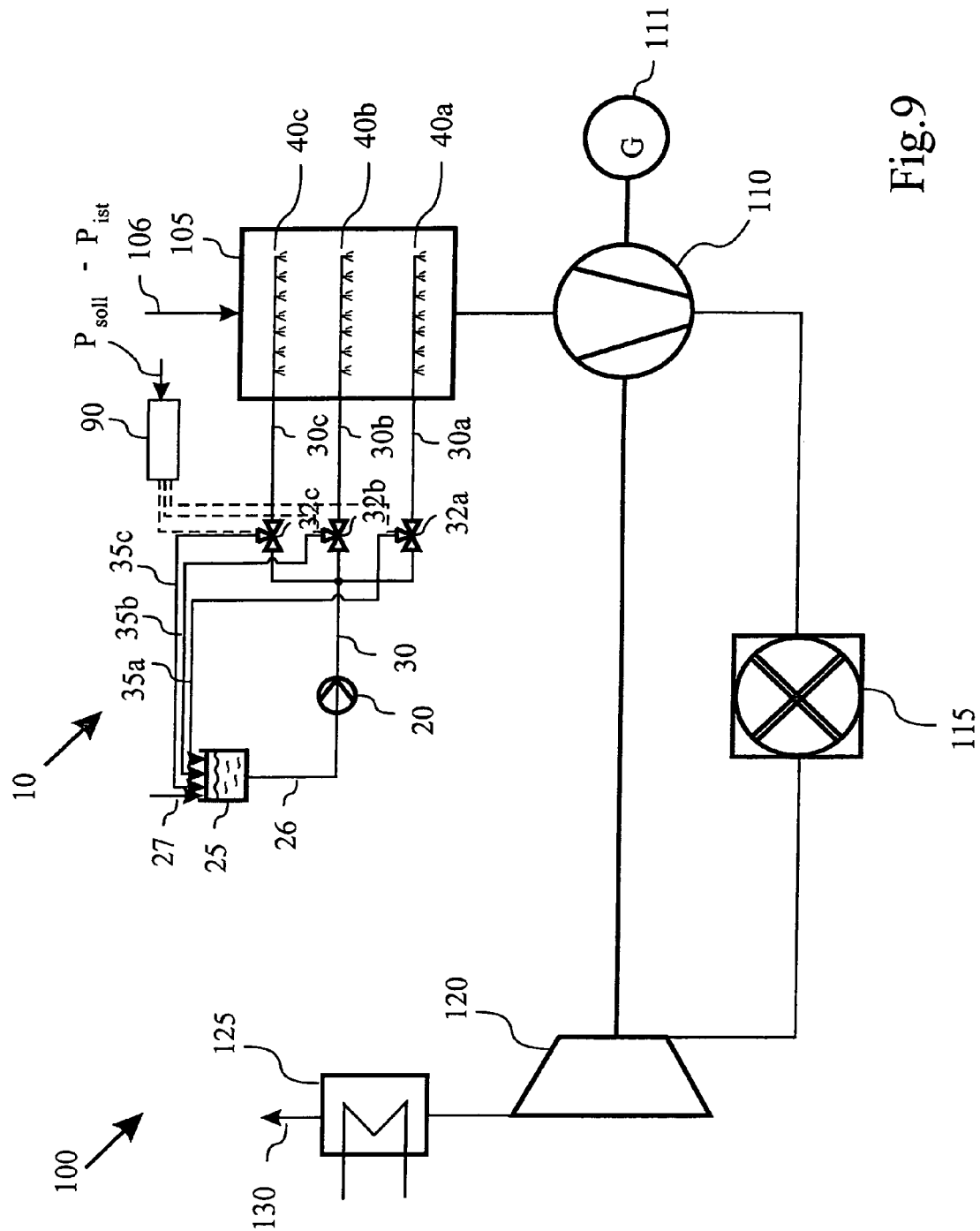
FIG. 9 shows an exemplary gas turbine plant with a liquid injection unit having a delivery apparatus.

FIG. 9, in a further schematic illustration, shows a gas turbine plant 100 with a liquid injection unit which is supplied with liquid, for example water, by a delivery apparatus 10. The gas turbine plant 100 comprises a compressor 110, a generator 111, a combustion chamber 115, a turbine 120 and an exhaust-gas heat exchanger 125. The exhaust-gas heat exchanger 125 is optional, i.e. it may also be omitted depending on the design of the gas turbine plant. In FIG. 9, the air inlet is identified by 106 and the exhaust-gas outlet is identified by 130.

In the gas turbine plant 100 shown in FIG. 9, a spraying arrangement 105 for spraying water into the compressor inlet flow is arranged upstream of the compressor 110. The spraying arrangement 105 may be integrated in the intake duct upstream of the compressor. Here, by way of example and in a greatly simplified manner, the spraying arrangement 105 comprises three nozzle groups 40a, 40b, 40c with in each case a number of nozzle openings, arranged in a suitably distributed manner over the cross section of flow of the compressor flow, for spraying water into the inlet flow 106.

The nozzle groups may also be arranged, for example, on one or more concentric nozzle rings. The nozzle groups are in turn connected via the delivery lines 30, 30a, 30b, 30c to the pump 20, and this pump is in turn connected via the supply line 26 to a water supply tank 25. The latter is charged from a water preparation arrangement (not shown) for providing purified and demineralized water. The pump 20 draws in water from the supply tank 25 and pumps said water into the delivery line 30, which is split up into the individual delivery lines 30a, 30b, 30c. A respective 3/2-way directional control valve 32a, 32b, 32c is integrated in each of the individual delivery lines 30a, 30b, 30c, the respective second outlet of the 3/2-way directional control valves 32a, 32b, 32c being connected to one branch line 35a, 35b, 35c each. The branch lines 35a, 35b, 35c each lead back into the supply tank 25. Output values of a gas turbine control are preset at the control unit 90.

According to one embodiment, the control unit 90 determines control signals for the spraying from the setpoint/actual-value deviation in such a way that, in the event of a negative setpoint/actual-value deviation of the output $P_{setpoint} - P_{actual}$, liquid is additionally admitted in a selective manner to at least one nozzle and/or nozzle group in order to increase the mass flow and, in the event of a positive setpoint/actual-value deviation, in which the actual output is greater than the output setpoint, the liquid feed to at least one nozzle and/or nozzle group is selectively switched off.

Alternatively, the gas turbine control can also determine a setpoint mass flow or a mass flow delta for the mass flow to be atomized from a deviation of the output or also from measured temperature and pressure values, this mass flow then passing as an input variable to the control unit 90. In order to be able to start the spraying of liquid into the compressor inlet flow, the pump 20 is first of all run up to speed in a starting operation. To this end, those outlets of the 3/2-way directional control valves 32a, 32b, 32c which are connected to the individual branch lines 35a, 35b, 35c are opened. Water delivered by the pump 20 during the starting operation therefore passes via the branch lines 35a, 35b, 35c back into the supply tank 25.

After the pump 20 has been run up to speed, the pump continuously delivers water from the supply tank 25 into the delivery line 30 irrespective of the liquid mass flow sprayed in each case into the compressor flow. If the spraying of liquid into the inlet flow of the compressor is to be started after the pump 20 has been run up to speed, at least one of the 3/2-way directional control valves 32a, 32b, 32c is changed over, and thus the flow path via the corresponding branch line is interrupted and at the same time the flow path to the corresponding nozzle or nozzle group is opened up. Thus the liquid mass flow, which beforehand was recirculated via the diversion line, is diverted in a simple manner to the nozzles.

In an expedient design of the cross sections of flow, the entire delivery mass flow of the pump remains constant, at least in a first approximation, in such a way that the pump does not have to comprehend any transient change in the operating state. In this way, the liquid mass flow sprayed into the compressor inlet flow can also be changed suddenly without having to take into account the dynamics of the pump, which of course is only able to provide finite mass flow gradients. This is also especially important when the gas turbine group 100 works, for example, in frequency backup operation, in which steep load output gradients have to be produced.

Of course, the invention also permits other embodiments and modifications of the examples shown which are contained within the scope of the invention characterized in the patent claims. In particular, in a most advantageous manner, a suitable means for cooling the recirculating fluid is arranged in the branch lines in all the embodiments described above, a factor which is virtually imperative.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Actual characteristic of the mass flow of a conventional delivery apparatus
2 Setpoint characteristic of the mass flow
10 Delivery apparatus
20 Delivery device, pump
25 Supply tank
26 Supply line
27 Feed line
30, 30a, 30b, 30c Delivery line
31 Branching point (T-element)
32a, 32b, 32c Branching point (3/2-way directional control valve)
35, 35a, 35b
35c, 35d Branch line
36 Regulating member
37 Pressure measuring point
38 Mass-flow measuring point
40a, 40b, 40c Nozzle carrier, nozzle tube
41$a_I$, 41$a_{II}$, ... 41$a_{VII}$;
41$b_I$, 41$b_{II}$, ... 41$b_{VII}$;
41$c_I$, 41$c_{II}$, ... 41$c_{VII}$ Atomizing element, nozzle opening
45a, 45b, 45c Regulating member
50 High-pass filter
51 Low-pass filter
52 Variable-speed drive, electric motor
90 Control unit
91a, 91b, 91c,
92, 92a, 92b, 92c Control line
100 Gas turbine plant
105 Spraying arrangement
106 Air inlet
110 Compressor
111 Generator
115 Combustion chamber
120 Turbine
125 Exhaust-gas heat exchanger
130 Exhaust-gas outlet
m Mass flow
t Time
$P_{setpoint}$ Setpoint output
$P_{actual}$ Actual output

What is claimed is:

1. An apparatus for continuously delivering and non-intermittently introducing a liquid into a main compressor flow of a gas turbine, comprising: a supply line; a delivery line; a delivery device for delivering a mass flow of the liquid from the supply line to the delivery line; at least one atomizing element communicating with the delivery line; a branch line which branches off from the delivery line being arranged in the delivery direction downstream of the delivery device and upstream of the atomizing element; at least one changeover and/or regulating member for shutting off and/or throttling the branch line being arranged in combination with the branch line; a pressure measuring point being arranged in the delivery line; a first pressure regulator connected to the measured pressure, filtered via a high-pass filter for the selection of high-frequency changes of pressure, as a controlled variable and to the position of a regulating member, arranged in the branch line, as a manipulated variable to compensate for high-frequency changes of pressure; and a second pressure controller connected to the measured pressure, filtered via a low-pass filter for the selection of low-frequency changes of pressure, as a controlled variable to compensate for low frequency pressure fluctuations and to the position of an output controller of the delivery device.

2. The apparatus as claimed in claim 1, wherein the delivery line branches into a plurality of individual delivery lines, at least one of the individual delivery lines being connected to an atomizing element.

3. The apparatus as claimed in claim 2, wherein a shut-off member is arranged in at least one individual delivery line.

4. The apparatus as claimed in claim 2, wherein a branch line branches off from at least one of the individual delivery lines.

5. The apparatus as claimed in claim 4, wherein a branch line branches off from each individual delivery line.

6. The apparatus as claimed in claim 1, wherein the changeover and/or regulating member is a multiway directional control valve.

7. The apparatus as claimed in claim 1, wherein the changeover and/or regulating member is a shut-off element or throttle element arranged in the branch line.

8. The apparatus as claimed in claim 1, wherein the pressure measuring point is arranged in the delivery line downstream of the branching point of the branch line, and a pressure controller is connected to the measured pressure as a controlled variable and to the position of the changeover and/or regulating member as a manipulated variable.

9. The apparatus as claimed in claim 1, wherein a measuring point for a liquid mass flow is arranged in the delivery line downstream of the branching point of the branch line, and a controller is connected to the measured mass flow as a controlled variable and to the position of the changeover and/or regulating member as a manipulated variable.

10. A heat engine, in combination with an apparatus as claimed in claim 1, the at least one atomizing element communicating with the delivery line being arranged in an inflow duct of the heat engine.

11. A gas turboset, in combination with the apparatus as claimed in claim 1, wherein the at least one atomizing element communicating with the delivery line is arranged upstream of a compressor stage.

12. A method of continuously delivering and non-intermittently introducing a liquid mass flow into a main compressor flow of a gas turbine, comprising: continuously delivering a delivery mass flow by a delivery device; introducing at least a partial mass flow of the delivery mass flow into the main flow; and drawing off a branch mass flow downstream of the delivery device in order to change the partial mass flow, to be introduced, by a differential mass, wherein the liquid mass flow is delivered into a delivery line, the branch mass flow being branched off at a branching point; measuring the pressure in the delivery line, the measured pressure being filtered with a high pass filter for the selection of high-frequency changes of pressure and the high-pass-filtered pressure compensating for high-frequency changes of pressure and being regulated via the branched-off liquid mass flow; and filtering the measured pressure with a low pass filter for the selection of low-frequency changes of pressure, the low-pass-filtered pressure compensating for low frequency pressure fluctuations and being regulated via the liquid mass flow delivered by the delivery device.

13. The method as claimed in claim 12, comprising: conducting the branched-off liquid mass flow in a branch line, the branched-off liquid mass flow being regulated via the position of a regulating member arranged in the branch line.

14. The method as claimed in claim 12, wherein one or more nozzle tubes and/or one or more nozzles are switched on or switched off for changing the partial mass flow, to be introduced, by the differential mass flow.

15. The method as claimed in claim 12, wherein the setpoint of the liquid mass flow and/or the number of nozzle tubes to which liquid is admitted are/is set by an output controller of a prime mover.

16. The method as claimed in claim 12, wherein the magnitude of the branch mass flow is changed essentially by the differential mass flow, with opposite sign of the change, and the delivery mass flow being kept essentially constant.

17. The method as claimed in claim 12, comprising: delivering the delivery mass flow into a delivery line, the branch mass flow being branched off at a branching point, the pressure in the delivery line being measured downstream of the branching point, and this pressure being regulated via the branched-off liquid mass flow.

18. The method as claimed in claim 12, comprising: delivering the delivery mass flow into a delivery line, the branch mass flow being branched off at a branching point, the liquid mass flow which has not been branched off being measured downstream of the branching point, and the liquid mass flow which has not been branched off being regulated via the branched-off liquid mass flow.

19. The apparatus as claimed in claim 2, wherein a shut-off member is arranged at each individual delivery line.

20. The apparatus as claimed in claim 6, wherein the changeover and/or regulating member is a 3/2-way directional control valve.

21. An apparatus for continuously delivering and non-intermittently introducing a liquid into a main compressor flow of a gas turbine, comprising: a supply line; a delivery line; a delivery device for delivering a mass flow of the liquid from the supply line to the delivery line; at least one atomizing element communicating with the delivery line; a branch line which branches off from the delivery line being arranged in the delivery direction downstream of the delivery device and upstream of the atomizing element; at least one changeover and/or regulating member for shutting off and/or throttling the branch line being arranged in combination with the branch line; a pressure measuring point being arranged in the delivery line; a first pressure regulator connected to the measured pressure, filtered via a high-pass filter for the selection of high-frequency changes of pressure, as a controlled variable and to the position of a regulating member, arranged in the branch line, as a manipulated variable to compensate for high-frequency changes of pressure.

* * * * *